US012275083B2

(12) United States Patent
Tang et al.

(10) Patent No.: US 12,275,083 B2
(45) Date of Patent: Apr. 15, 2025

(54) INTEGRATED MACHINE FOR AUTOMATIC CUTTING, POLISHING, STACKING AND UNLOADING OF SUBSTRATES

(71) Applicant: Southwest Petroleum University, Chengdu (CN)

(72) Inventors: Yang Tang, Chengdu (CN); Shang Xiang, Chengdu (CN); Li Ma, Suining (CN); Xiaoping Hu, Suining (CN); Xuebin Hao, Suining (CN); Peng Sun, Suining (CN); Guorong Wang, Chengdu (CN); Hongyong Tang, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 18/767,908

(22) Filed: Jul. 9, 2024

(65) Prior Publication Data

US 2025/0073808 A1   Mar. 6, 2025

(51) Int. Cl.
*B23K 26/00*     (2014.01)
*B23K 26/03*     (2006.01)
(Continued)

(52) U.S. Cl.
CPC ........ *B23K 26/0093* (2013.01); *B23K 26/032* (2013.01); *B23K 26/035* (2015.10);
(Continued)

(58) Field of Classification Search
None
See application file for complete search history.

(56) References Cited

U.S. PATENT DOCUMENTS 5,752,797 A   5/1998   Westerfield, Jr. et al.
10,220,469 B2 *   3/2019   Yamashita ......... B23K 26/0869
(Continued)

FOREIGN PATENT DOCUMENTS

CN   212907645 U   4/2021
CN   213797882 U   7/2021
(Continued)

OTHER PUBLICATIONS

Machine translation of CN-115592530_A, Sep. 2024 (Year: 2024).*
(Continued)

*Primary Examiner* — Geoffrey S Evans

(57) ABSTRACT

An integrated machine for automatic cutting, polishing, stacking, and unloading of substrates, including a laser cutting machine, a mechanical laser arm, a polishing machine, a polishing device, a first finished product placement rack, a second finished product placement rack, and an automatic stacking device. The mechanical laser arm is fixed on the frame of the laser cutting machine, the polishing device is fixed on the polishing machine, and the first finished product placement rack and the second finished product placement rack are arranged on both sides of the automatic stacking device. The present disclosure can achieve cutting the substrates of any size, and can automatically polish the edges of the cut substrates. The present disclosure has the characteristics of automation, integration, and multi-functionality, effectively reducing the number of supporting equipment and occupying space.

7 Claims, 8 Drawing Sheets

(51) Int. Cl.
  *B23K 26/035* (2014.01)
  *B23K 26/70* (2014.01)
  *B24B 37/04* (2012.01)
  *B24B 37/34* (2012.01)
  *B24B 55/04* (2006.01)
  *B65G 57/04* (2006.01)

(52) U.S. Cl.
  CPC ............ *B23K 26/706* (2015.10); *B24B 37/04* (2013.01); *B24B 37/345* (2013.01); *B24B 55/04* (2013.01); *B65G 57/04* (2013.01)

(56) References Cited

U.S. PATENT DOCUMENTS

| | | |
|---|---|---|
| 2002/0182025 A1 | 12/2002 | Colton et al. |
| 2010/0202126 A1 | 8/2010 | Nakamura et al. |
| 2015/0020358 A1 | 1/2015 | Wu et al. |
| 2015/0113802 A1 | 4/2015 | Kotsubo et al. |
| 2016/0075035 A1* | 3/2016 | Sun ................ B25J 15/0616 294/188 |
| 2022/0040848 A1 | 2/2022 | Lualdi |

FOREIGN PATENT DOCUMENTS

| | | | |
|---|---|---|---|
| CN | 115592530 A | * | 1/2023 |
| JP | 2013021146 A | | 1/2013 |
| KR | 19980083505 A | | 12/1998 |
| KR | 20100130682 A | | 12/2010 |

OTHER PUBLICATIONS

Gu Yuxuan; Wang Xiao; Shen Zongbao; Qiu Tangbiao; Ma Youjuan; Zhang Di; Liu Huixia, "Experimental Study of Ti/Al Impact Spot Welding by Intense Laser Pulse Induced Shock Waves", Chinese Journal of Lasers, Issue 05, May 10, 2015, pp. 86-94.

Zhu Fu-jun et al., "Analysis on Turning Method of Ptfe Gasket", Construction & Design for Project, Dec. 31, 2020, pp. 132-133.

* cited by examiner

INTEGRATED MACHINE FOR AUTOMATIC CUTTING, POLISHING, STACKING AND UNLOADING OF SUBSTRATES

CROSS-REFERENCE TO RELATED APPLICATIONS

This application claims priority to Chinese Application No. 202311106510.2, filed on Aug. 30, 2023, entitled "INTEGRATED MACHINE FOR AUTOMATIC CUTTING, POLISHING, STACKING AND UNLOADING OF SUBSTRATES". These contents are hereby incorporated by reference.

TECHNICAL FIELD

The present disclosure relates to the technical field of substrate processing and manufacturing, in particular to an integrated machine for automatic cutting, polishing, stacking, and unloading of substrates.

BACKGROUND

CCL, also known as copper clad laminate, is an electronic engineering material composed of substrate, copper foil layer, and adhesive. The main functions of CCL are as follows: CCL is the basic material of PCB, which can provide sufficient mechanical strength to enable PCB to withstand external vibration and impact, ensuring the stability and reliability of the circuit board; the copper foil layer of CCL has good conductivity, which can form wire and circuit patterns on the circuit board, achieving electrical connections and signal transmission between different electronic components; further, the copper foil layer can provide good heat dissipation performance, playing an auxiliary role in the heat dissipation of circuit components.

PCB, also known as printed circuit board, is an electronic component support body that uses printing technology to print conductive circuit patterns on a substrate. The main functions of a PCB are as follows: the wires and circuit patterns on the PCB can connect electronic components together, forming a complete circuit; through reasonable wiring and arrangement, signal transmission, power supply, and interruption control can be achieved, ensuring the normal operation of the circuit; the electronic components on the PCB are fixed to the wires and circuit patterns through welding technology, ensuring stable and reliable connection of the components in the circuit, in this way, it not only facilitates the installation and replacement of electronic components, but also reduces faults and wire breaks between components. By printing circuit patterns on the PCB, a compact layout and size compression of the circuit can be achieved. Compared to traditional random wiring methods, the PCB board can make electronic devices smaller in size, improve integration and efficiency.

In one word, CCL and PCB play important roles in electronic manufacturing, helping to connect electronic devices, transmit signals, and achieve functionality, thereby improving the performance and reliability of electronic devices. The CCL and PCB are collectively referred to as substrates throughout the text.

There are many classifications of substrates:
According to the flexibility of the substrate material, it can be divided into rigid printed circuit boards (R-PCB), flexible printed circuits (F-PCB), and rigid-flexible printed circuit boards;
According to the number of layers of conductive graphics, it can be divided into single-sided printed circuit boards, double-sided printed circuit boards, and multi-layer printed circuit boards. Further, multi-layer printed circuit board can be divided into medium-layer and low-layer printed circuit board and high-layer board printed circuit board;
According to the application field, it can be divided into communication boards, consumer electronics boards, computer boards, automotive electronics boards, and so on.

Substrates are an important component of electronic products and can be applied in many situations, including but not limited to the following 5 aspects:
Firstly, consumer electronics: This includes all electronic products used in daily lives, such as audio and video systems, televisions, videos, and DVD players, digital cameras, computers and laptops, mobile phones and GPS, household and kitchen utensils, etc;
Secondly, medical devices: High density substrates can be used for medical devices, reducing the complexity of manufacturing small and lightweight medical devices, such as small pacemakers, large X-ray and CAT machines, etc;
Thirdly, industrial machinery: Thick copper substrates are commonly used in high-power industrial machinery, such as motor controllers, industrial load testers, and high current battery charging, where the presence of thick copper substrates can be found;
Fourthly, LED applications: LED lights are another common substrate device known for improving power consumption. LED lights have a substrate that serves as a heat sink, allowing for higher levels of heat transfer than ordinary substrates;
Fifth, automotive and aerospace related equipment: Substrates are designed to withstand high vibration environments and can be used in automotive and aerospace industry related equipment; flexible substrates support the vibration characteristics of these industries, and they are very flexible and can adapt to very narrow spaces designed within the equipment, this is crucial for manufacturing transportation components and industries with high impact and low weight requirements.

In short, the application of substrates is almost ubiquitous, and almost all fields that require electronic circuits may require the use of substrates.

In the entire process of substrate processing, cutting is of great significance as the last step of substrate processing: firstly, cutting can cut large substrates into small pieces of the required size, making subsequent assembly and installation more convenient and efficient, thereby improving production efficiency; secondly, the cutting process can cut off unnecessary areas and reduce material waste, which is particularly important for large-scale production substrates and can save costs; thirdly, cutting can ensure that the size and shape of each small substrate are consistent, thereby improving the quality and consistency of production; fourthly, the cut small substrate can be easily assembled and installed, such as soldering components, inserting connectors, etc., which helps to improve the overall reliability and stability of the circuit board.

Polishing the substrate after cutting is an important step to improve the quality and reliability of the substrate. The benefits of polishing mainly include: the surface of the cut substrate may have burrs, or uneven edges. By polishing, these uneven parts can be repaired, making the surface smoother and avoiding damage to other components due to uneven surfaces; polishing can remove sharp or protruding parts at edges and holes on the substrate, so as to prevent damage to components or conductive circuits during assembly or use, and improve the reliability and safety of the substrate; during the cutting process, there may be some scratches or damage to the substrate, which can be repaired by polishing to ensure a complete substrate; polishing can make the edges of the substrate smoother, making the splicing between different plates more precise, improving the fit, and avoiding circuit connection problems caused by large gaps or misalignment. Therefore, polishing the cut substrate is crucial.

Although substrate cutting machines have had a large number of applications and significant development, with the increasing quality requirements for core components in modern electronic products, existing substrate cutting machines in practical applications are not as fully functional as integrated machines, and there are many problems. The main problems are as follows:

1. The lack of use of an integrated machine results in a low level of automation in the entire cutting process, which increases manual intervention, and is inability to handle larger substrates, and inability to achieve higher production requirements. Moreover, most existing machines use rotary cutting tools, and the size, shape, and variety of substrates are diverse. A single rotary cutting tool is difficult to meet cutting requirements, and with prolonged use, the tool is prone to problems such as passivation and downward movement, which affects cutting speed and reduces production efficiency.

2. The failure to use an integrated machine results in a reduction in the machine functionality, which is inability to provide more functional options and flexibility, and failure to consider more complex requirements. For example, the existing machines did not consider the issue of polishing the cut edges of the substrate after cutting, and the cut edges of the substrate would have burrs and unevenness, which would affect the quality of the substrate and cause trouble for subsequent installation.

3. Not using an integrated machine results in insufficient stability and convenience of the machine, which cannot operate stably for a long time and increases maintenance and downtime. For example, existing machines have waste in handling, which is a non value-added action. Waste in handling is manifested in waste in placement, stacking, movement, and organization, which affects the production efficiency and logistics management efficiency of the substrate and reduces production efficiency.

4. Not using an integrated machine increases the number of devices and occupied space, increasing operational difficulty and the costs of labor and material.

Therefore, it is necessary to improve the cutting machine. An integrated machine for automatic cutting, polishing, stacking, and unloading of substrates designed in the present disclosure integrates multiple cutting processes together: using a laser cutting machine to perform laser cutting on the substrate, and installing a cantilever mechanical laser arm to meet the flexible cutting of different sizes and shapes of the substrate; using a specially designed polishing device to polish the edges of the cut substrate, in order to smooth the cut surface and improve quality, facilitating the subsequent installation process of the substrate; using a specially designed automatic stacking device to automatically stack the polished substrates according to different size requirements to improve production efficiency and logistics management efficiency. In addition, the finished product placement rack is convenient for the placement, stacking, unloading, and arrangement of substrates, saving costs and avoiding waste during transportation.

SUMMARY

To addresses issues such as cutting, polishing, and transporting of substrates, an integrated machine for automatic cutting, polishing, stacking, and unloading of substrates is provided by the present disclosure, which integrates multiple cutting processes together: using a laser cutting machine to perform laser cutting on the substrate, and installing a cantilever mechanical laser arm to meet the flexible cutting of different sizes and shapes of the substrate; using a specially designed polishing device to polish the edges of the cut substrate, in order to smooth the cut surface and improve quality, facilitating the subsequent installation process of the substrate; using a specially designed automatic stacking device to automatically stack the polished substrates according to different size requirements to improve production efficiency and logistics management efficiency. In addition, the finished product placement rack is convenient for the placement, stacking, unloading, and arrangement of substrates, saving costs and avoiding waste during transportation.

To achieve the above objectives, the present disclosure is achieved through the following technical solution:

A integrated machine for automatic cutting, polishing, stacking, and unloading of substrates is provided, which includes a laser cutting machine, a mechanical laser arm, an operating system, a polishing machine, a polishing device, a first finished product placement rack, a second finished product placement rack, and an automatic stacking device.

Further, the mechanical laser arm is fixed on the laser cutting machine bench, the operating system is fixed on a laser cutting machine protective cover, the polishing device is fixed on a polishing machine bench, the first finished product placement rack is placed on a side of a second bracket, and the second finished product placement rack is placed on a side of a first bracket; the laser cutting machine, the polishing machine, the automatic stacking device, the first finished product placement rack, and the second finished product placement rack are all placed on the same horizontal plane.

Further, the laser cutting machine includes a laser cutting machine bench and a laser cutting machine head, wherein the laser cutting machine bench includes a cutting table, a mechanical laser arm, and a first motor, wherein the first motor, the cutting table, and the mechanical laser arm are all fixed on the laser cutting machine bench, and an operating range of the mechanical laser arm is an area of the cutting table. The laser cutting machine head includes the laser cutting machine protective cover, the operating system, and a first camera and a second camera, wherein the operating system is fixed on an outside of a side of the laser cutting machine protective cover, and the first camera and the second camera are fixed on an inside of a top of the laser cutting machine protective cover.

Further, the mechanical laser arm includes a laser equipment, a first rotary joint, a second rotary joint, a third rotary joint, a fourth rotary joint, and a laser source, wherein the laser equipment is fixed on an outer wall of the mechanical laser arm, the mechanical laser arm is combined by the first rotary joint, the second rotary joint, the third rotary joint, the fourth rotary joint, and the mechanical laser arm rotates through the rotary joints, the laser source is fixed at an end of the mechanical laser arm through the fourth rotary joint, and the mechanical laser arm is rotated freely with 7 degrees of freedom.

Further, the polishing machine includes the polishing machine bench and a polishing machine head, wherein the polishing machine bench includes a polishing table, a first sliding rail, a second sliding rail, a polishing device, a first telescopic rod, and a second telescopic rod; the polishing table, the first telescopic rod, and the second telescopic rod are fixed on the polishing machine bench; the second sliding rail is fixed on the first telescopic rod and the second telescopic rod; the first sliding rail slides within a track of the second sliding rail; the polishing device slides within a track of the first sliding rail, and a polishing range is an area of the polishing table. The polishing machine head includes a polishing machine protective cover, a third sliding rail, a fourth sliding rail, a third telescopic rod, a vacuum suction device, a first vacuum machine, and a tri-color light, wherein the third sliding rail is fixed on an inner wall of a top of the polishing machine protective cover, the fourth sliding rail slides within a track of the third sliding rail, the vacuum suction device is fixed on the third telescopic rod, the third telescopic rod slides within a track of the fourth sliding rail, and the first vacuum machine and the tri-color light are fixed on a top of an outer wall of the polishing machine protective cover;

Further, the automatic stacking device includes a second motor, a conveying device, a first bracket, a second bracket, a third motor, a fourth motor, a second vacuum machine, a third vacuum machine, a first suction cup manipulator, and a second suction cup manipulator, wherein the second motor is fixed on the conveying device, the third motor and the second vacuum machine are fixed on the first bracket, the fourth motor and the third vacuum machine are fixed on the second bracket, the first suction cup manipulator and the second suction cup manipulator are respectively fixed on the first bracket and the second bracket, and the first bracket and the second bracket are arranged on both sides of the conveying device.

Further, the first suction cup manipulator includes a first chassis, a first rotation device, a second rotation device, a third rotation device, a fourth rotation device, a first fixture, and a first vacuum suction cup; the first suction cup manipulator slides on the first bracket through the first fixture arranged on the first chassis, and is combined with the first rotation device, the second rotation device, the third rotation device, the fourth rotation device, allowing for any rotation with 6 degrees of freedom; and the first vacuum suction cup is fixed at an end of the first suction cup manipulator through the fourth rotation device.

Further, the second suction cup manipulator includes a second chassis, a fifth rotation device, a sixth rotation device, a seventh rotation device, an eighth rotation device, a second fixture, and a second vacuum suction cup; the second suction cup manipulator slides on the second bracket through the second fixture arranged on the second chassis, and is combined with the fifth rotation device, the sixth rotation device, the seventh rotation device, the eighth rotation device, allowing for any rotation with 6 degrees of freedom; and the second vacuum suction cup is fixed at an end of the second suction cup manipulator through the eighth rotation device.

Further, the operating system includes an operation panel, a stepper motor, a displacement sensor, a machine vision sensor, a pneumatic actuator, a signal converter, a power supply, an indicator light, a circuit breaker, and a protection device.

Further, the first finished product placement rack includes a first frame, a first cabinet door, a first placement plate, a first roller, a second roller, a third roller, and a fourth roller; the first placement plate, the first cabinet door, the first roller, the second roller, the third roller, and the fourth roller are respectively fixed to the first frame.

Further, the second finished product placement rack includes a second frame, a second cabinet door, a second placement plate, a fifth roller, a sixth roller, a seventh roller, and an eighth roller; the second cabinet door, the second placement plate, the fifth roller, the sixth roller, the seventh roller, and the eighth roller are respectively fixed to the second frame.

Further, an operation method for the integrated machine for automatic cutting, polishing, stacking, and unloading of substrates, during cutting and polishing process, a working process is divided into processes of cutting substrates, polishing substrates, and automatic stacking and unloading substrates, including the following steps:

S1, Cutting a substrate, including the following steps:
S11, Settings before cutting: first setting a size of the substrate to be cut on the operating system (2), wherein the size of the substrate to be cut on the laser cutting machine (1) is any size, but at most two different cutting sizes allow to be set each time; after the substrate is unloaded, different cutting sizes allow to be set again;
S12, Formal cutting process: when the substrate enters the laser cutting machine (1), the first camera (24) on the laser cutting machine (1) starts scanning the substrate; when the substrate stops on the cutting table (17), the first camera (24) positions the substrate, then finds a midpoint position of the substrate, and then fixes the laser source (16) on the mechanical laser arm (59) to cut the substrate according to the set size requirements through the laser equipment (11), wherein a cutting range of the mechanical laser arm (59) is the area of the cutting table (17), and the mechanical laser arm (59) has 7 degrees of freedom to flexibly complete the cutting of the substrate; obtaining a cut substrate after the cutting is completed, the cut substrate continues to be polished through the polishing machine (3);

S2, Polishing the cut substrate, including the following steps:
S21, The process of fixing the cut substrate: the cut substrate enters the polishing machine (3) for polishing, and the second camera (25) scans the cut substrate and sends position information of the cut substrate to the polishing machine (3); when the cut substrate stops on the polishing table (27), the second camera (25) locates the cut substrate, finds a midpoint position of the cut substrate, and the vacuum suction device (36) absorbs the cut substrate; the vacuum suction device (36) extends and retracts the cut substrate to a certain position through the third telescopic rod (60), and then stops to fix the cut substrate;
S22, The process of polishing the substrate: the polishing device (30) slides through the first sliding rail (28) and the second sliding rail (29), wherein the polishing range is the area of the polishing table (27); the second sliding rail (29) moves up and down through the first telescopic rod (31) and the second telescopic rod (32) to fit the substrate, and then the polishing device (30) polishes edges of the cut substrate; obtaining a polished substrate after polishing, the vacuum suction device (36) places the polished substrate on the polishing table (27)

through the third telescopic rod (60), and the polished substrate continues to be stacked through the automatic stacking device (8);

S3, The process of automatically stacking and unloading of the substrates, including the following steps:

S31, The process of automatically stacking includes following steps: transporting the polished substrate through a conveying device, the first suction cup manipulator (45) slides on the first bracket (39) through the first fixture (61) on the first chassis (42), and the second suction cup manipulator (49) slides on the second bracket (50) through the second fixture (62) on the second chassis (53), wherein the first suction cup manipulator (45) and the second suction cup manipulator (49) allow for any rotation with 6 degrees of freedom; the first vacuum suction cup (48) and the second vacuum suction cup (58) on the first suction cup manipulator (45) and the second suction cup manipulator (49) to suck and pick up the polished substrate on the conveying device (38) according to the set requirements; the first suction cup manipulator (45) and the second suction cup manipulator (49) respectively suck two different sizes of substrates, and place the two different substrates on the first finished product placement rack (6) and the second finished product placement rack (7), respectively, wherein the first finished product placement rack (6) and the second finished product placement rack (7) are configured to store the substrates of different sizes separately;

S32, The unloading process of finished products: the first finished product placement rack (6) and the second finished product placement rack (7) are respectively provided with wheels; when there are enough substrates stored on the first finished product placement rack (6) and the second finished product placement rack (7), pulling the first finished product placement rack (6) and the second finished product placement rack (7) to the designated storage area of the substrates, opening cabinet doors of the first finished product placement rack (6) and the second finished product placement rack (7), then unloading the substrates;

S33, Re-cutting process: after the unloading of the substrate is completed, placing the first finished product placement rack (6) and the second finished product placement rack (7) back in original positions. choosing to set a different cutting size on the operating system (2) of the laser cutting machine (1), but at most two cutting sizes allow to be set at the same time, or choosing to keep the cutting size last time without changed, so as to cut according to the original cutting size.

After adopting the above technical solution, the advantageous effects of the present disclosure are shown as below:

(1) The integrated machine can achieve automated operation throughout the entire cutting process, thereby reducing manual intervention and improving production efficiency. The integrated machine replaces traditional rotary cutting tools with laser cutting, using non-contact cutting, saving time without changing tools. Laser cutting can meet the requirements of high precision, high speed, and high quality. The cantilever mechanical laser arm can meet any cutting requirements of the substrate, with more flexible cutting and less cutting resistance. The installed protective cover can ensure the safety of equipment and operators. The integrated machine improves production efficiency, can handle more substrates with different size, and achieve higher production requirements.

(2) The integrated machine can provide more functional options and flexibility. A polishing function has been added to the integrated machine to polish the edges of the cut substrate to prevent protrusions and unevenness, facilitating the subsequent installation process of the substrate. The polishing machine is also equipped with a protective cover to prevent dust from scattering, so as to protect the safety of equipment and personnel, achieving higher quality substrate processing requirements.

(3) The integrated machine has increased sufficient stability and convenience, allowing for long-term stable operation, reducing maintenance and downtime. The automatic stacking device set up can achieve automatic stacking function after substrate cutting and polishing without stopping the machine. The automatic stacking device can stack two different sizes of substrates simultaneously, improving production efficiency and logistics management efficiency. The finished product placement rack set up is convenient for placing, stacking, unloading, and sorting of substrates, thereby saving costs, avoiding transportation waste, and improving production efficiency.

(4) The laser cutting machine can meet different cutting size requirements. After unloading the stacked substrates, the user can choose to set different cutting sizes on the operating system of the laser cutting machine, but only two can be set at the same time. The user can also choose not to change the setting of cutting size, so that it can still cut according to the original cutting size. Thus, the laser cutting machine can meet diverse cutting requirements.

(5) The integrated machine integrates a series of functions such as cutting, polishing, stacking, and unloading into one machine, reducing the number of equipment and space occupation, as well as reducing operational difficulty and labor and material costs.

Figure 1:
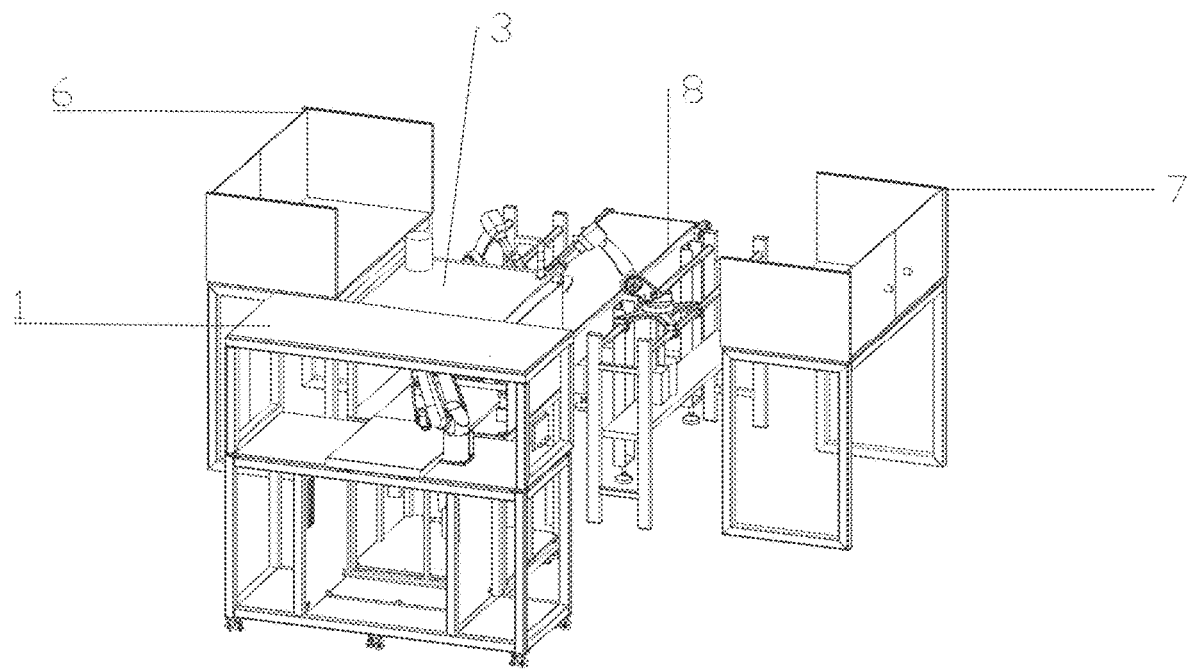
FIG. 1 is a structural diagram of the invention.
Figure 2:
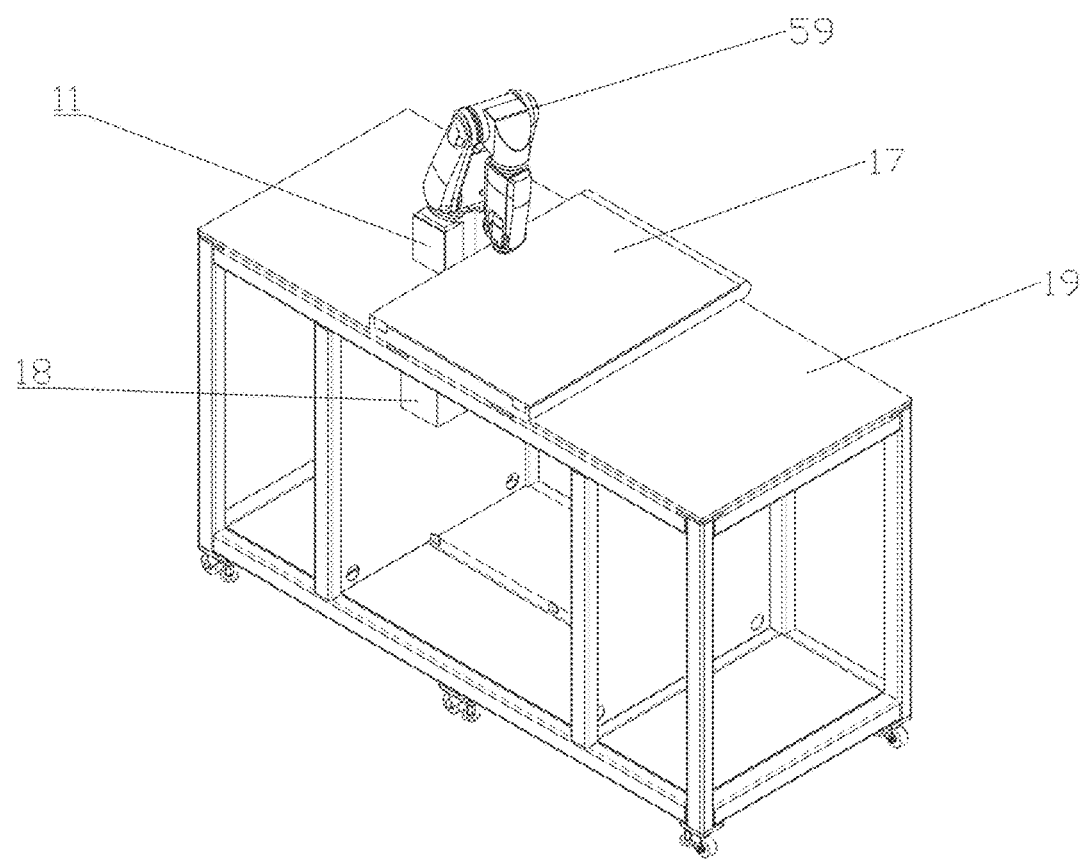
FIG. 2 is a schematic diagram of the laser cutting machine frame of the invention.
Figure 3:
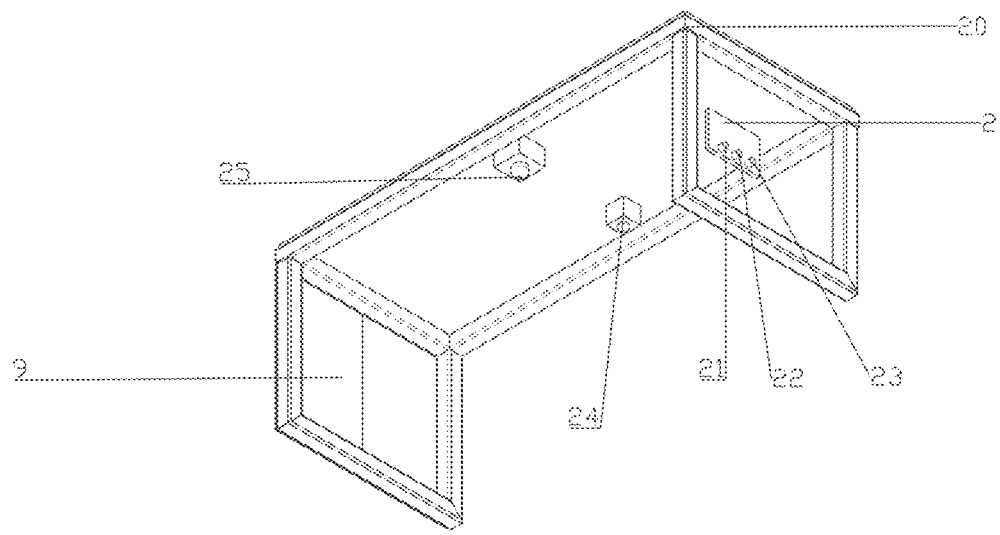
FIG. 3 is a schematic diagram of the laser cutting machine head of the invention.

The markings in the figure are: 1—laser cutting machine, 2—operating system, 3—polishing machine, 4—first vacuum machine, 5—tri-color light, 6—first finished product placement rack, 7—second finished product placement rack, 8—automatic stacking device, 9—laser cutting machine protective cover, 10—polishing machine protective cover, 11—laser equipment, 12—first rotary joint, 13—second rotary joint, 14—third rotary joint, 15—fourth rotary joint, 16—laser source, 17—cutting table, 18—first motor, 19—laser cutting machine bench, 20—laser cutting machine head, 21—emergency stop button, 22—start button, 23—pause button, 24—first camera, 25—second camera, 26—polishing machine bench, 27—polishing table, 28—first sliding rail, 29—second sliding rail, 30—polishing device, 31—first telescopic rod, 32—second telescopic rod, 33—polishing machine head, 34—third sliding rail, 35—fourth sliding rail, 36—vacuum suction device, 37—second motor, 38—conveying device, 39—first bracket, 40—third motor, 41—second vacuum machine, 42—first chassis, 43—first rotation device, 44—second rotation device, 45—first suction cup manipulator, 46—third rotation device, 47—fourth rotation device, 48—first vacuum suction cup, 49—second suction cup manipulator, 50—second bracket, 51—fourth motor, 52—third vacuum machine, 53—second chassis, 54—fifth rotation device, 55—sixth rotation device, 56—seventh rotation device, 57—eighth rotation device, 58—second vacuum suction cup, 59—mechanical laser arm, 60—third telescopic rod, 61—first fixture, 62—second fixture, 63—first frame, 64—first cabinet door, 65—first placement plate, 66—first roller, 67—second roller, 68—third roller, 69—fourth roller, 70—second frame, 71—second cabinet door, 72—second placement plate, 73—fifth roller, 74—sixth roller, 75—seventh roller, 76—eighth roller, 77—operating panel, 78—power supply, 79—indicator light, 80—circuit breaker, 81—stepper motor, 82—displacement sensor, 83—machine vision sensor, 84—protection device, 85—pneumatic actuator, 86—signal converter.

DETAILED DESCRIPTION

In order to make the technical problems, technical solutions and beneficial effects of the present invention clearer, the present invention will be further described in detail below with reference to the accompanying drawings and embodiments.

In the present invention, the terms "first," "second," "third" and so on are merely for the purpose of description, but cannot be understood as indicating or implying relative importance. The term "multiple" means two or more unless otherwise explicitly defined. The terms "mount," "connect with," "connect," "fix," and the like shall be understood in a broad sense. For example, "connect" may mean being fixedly connected, detachably connected, or integrally connected; and "connect with" may mean being directly connected or indirectly connected through an intermediary. For those of ordinary skill in the art, specific meanings of the above terms in the present invention can be understood according to specific situations.

In the description of the present invention, it should be understood that if orientation or position relations indicated by the terms such as "upper," "lower," "left," "right," "front," "back," and the like are based on the orientation or position relations shown in the drawings, and the terms are intended only to facilitate the description of the present invention and simplify the description, rather than indicating or implying that the apparatus or element referred to must have a particular orientation and be constructed and operated in the particular orientation, and therefore cannot be construed as a limitation on the present invention.

As shown in FIG. 1-FIG. 13, an integrated machine for automatic cutting, polishing, stacking, and unloading of substrates is provided by the present disclosure, which includes a laser cutting machine (1), a mechanical laser arm (59), an operating system (2), a polishing machine (3), a polishing device (30), a first finished product placement rack (6), a second finished product placement rack (7), and an automatic stacking device (8). The mechanical laser arm (59) is fixed on the laser cutting machine bench (19), the operating system (2) is fixed on a laser cutting machine protective cover (9), the polishing device (30) is fixed on a polishing machine bench (26), the first finished product placement rack (6) is placed on a side of a second bracket (50), and the second finished product placement rack (7) is placed on a side of a first bracket (39). The laser cutting machine (1), the polishing machine (3), the automatic stacking device (8), the first finished product placement rack (6), and the second finished product placement rack (7) are all placed on the same horizontal plane.

As shown in FIG. 1-FIG. 4, the laser cutting machine (1) includes a laser cutting machine bench (19) and a laser cutting machine head (20). The laser cutting machine bench (19) includes a cutting table (17), the mechanical laser arm (59), and a first motor (18), wherein the first motor (18), the cutting table (17), and the mechanical laser arm (59) are all fixed on the laser cutting machine bench (19), and an operating range of the mechanical laser arm (59) is the area of the cutting table (17). The laser cutting machine head (20) includes the laser cutting machine protective cover (9), the operating system (2), and a first camera (24) and a second camera (25), wherein the operating system (2) is fixed on the outside of a side of the laser cutting machine protective cover (9), and the first camera (24) and the second camera (25) are fixed on the inside of the top of the laser cutting machine protective cover (9).

Figure 4:
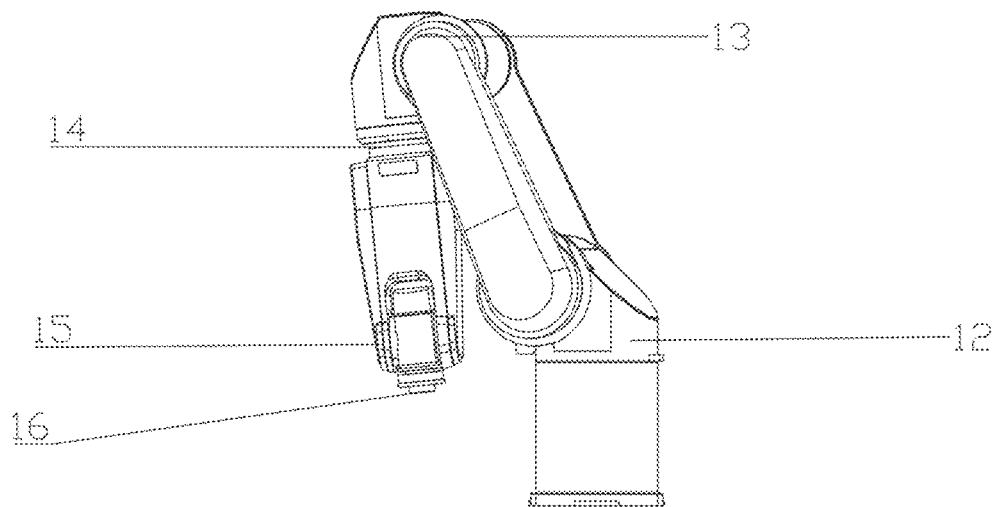
FIG. 4 is a schematic diagram of the mechanical laser hand of the invention.
Figure 5:
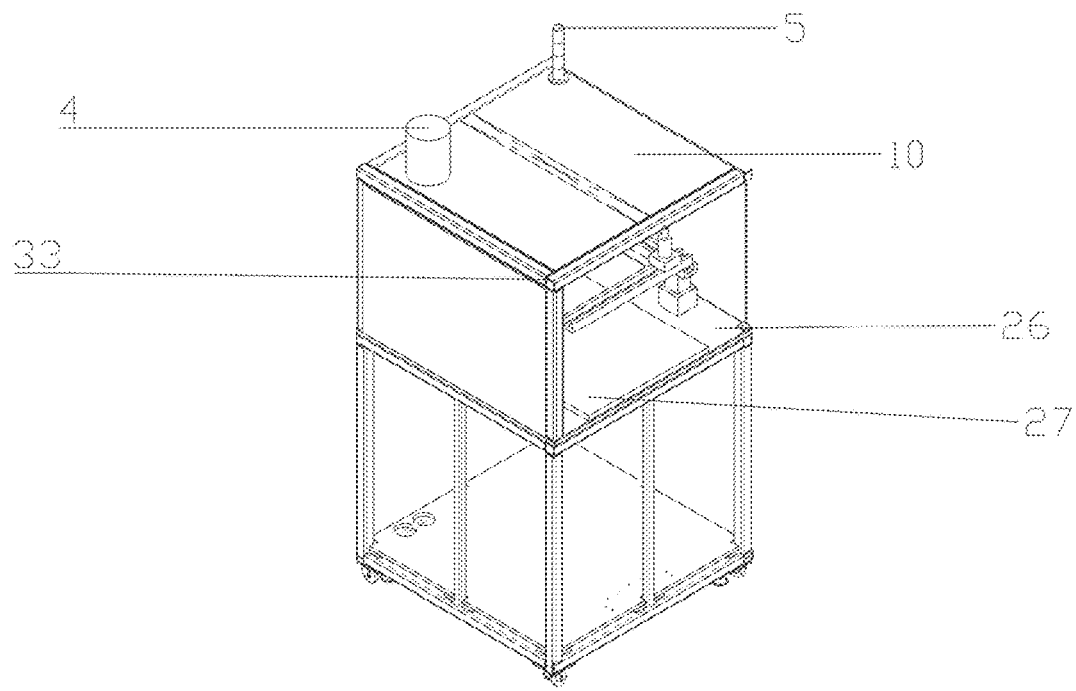
FIG. 5 is the overall diagram of the grinder of the invention.
Figure 6:
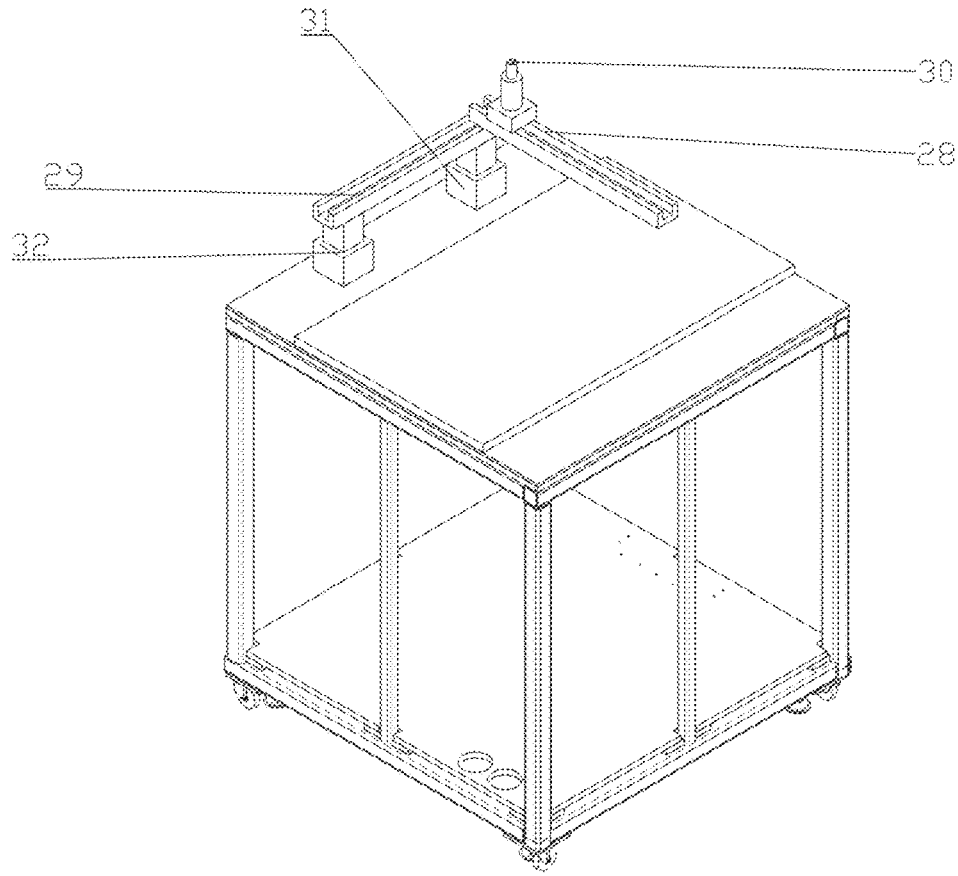
FIG. 6 is a schematic diagram of the grinding machine frame of the invention.
Figure 7:
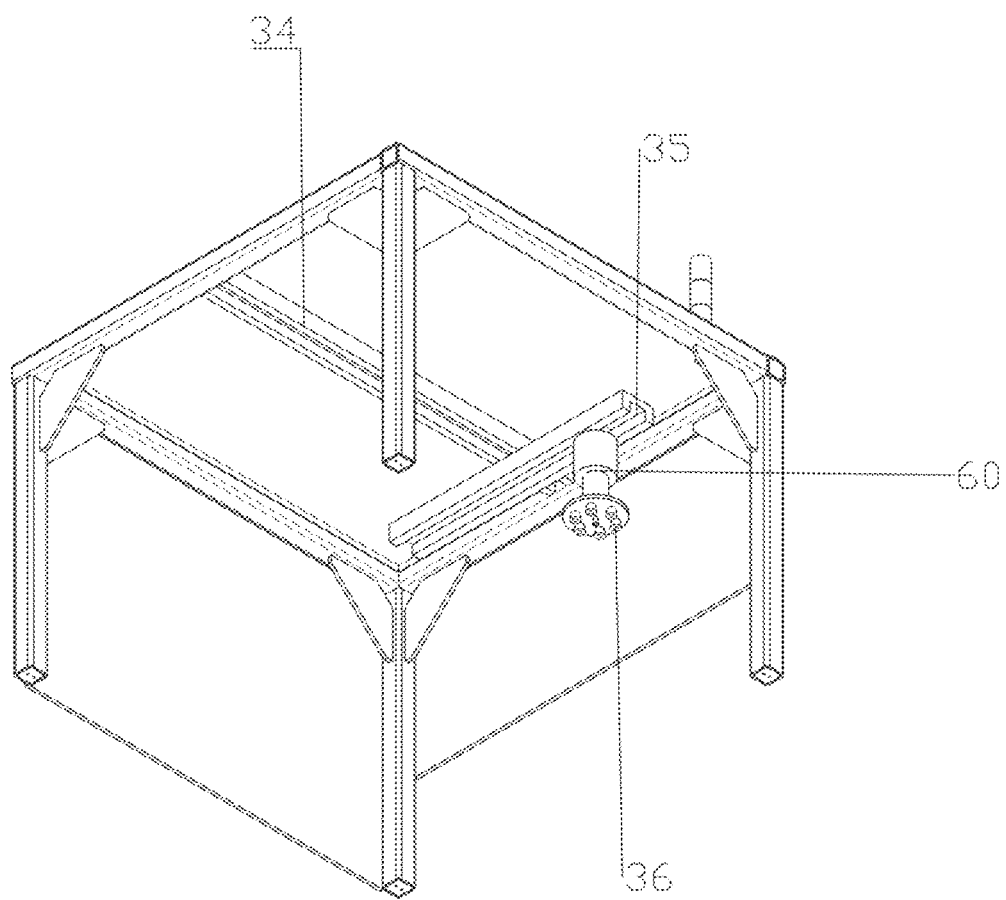
FIG. 7 is a schematic diagram of the grinding machine head of the invention.

As shown in FIG. 4, the mechanical laser arm (59) includes a laser equipment (11), a first rotary joint (12), a second rotary joint (13), a third rotary joint (14), a fourth rotary joint (15), and a laser source (16). The laser equipment (11) is fixed on the outer wall of the mechanical laser arm (59), the mechanical laser arm (59) is combined by the first rotary joint (12), the second rotary joint (13), the third rotary joint (14), the fourth rotary joint (15), and the mechanical laser arm (59) rotates through the rotary joints. The laser source (16) is fixed at the end of the mechanical laser arm (59) through the fourth rotary joint (15), and the mechanical laser arm (59) is rotated freely with 7 degrees of freedom.

As shown in FIG. 1 and FIG. 5-FIG. 7, the polishing machine (3) includes the polishing machine bench (26) and a polishing machine head (33). The polishing machine bench (26) includes a polishing table (27), a first sliding rail (28), a second sliding rail (29), a polishing device (30), a first telescopic rod (31), and a second telescopic rod (32). The polishing table (27), the first telescopic rod (31), and the second telescopic rod (32) are fixed on the polishing machine bench (26). The second sliding rail (29) is fixed on the first telescopic rod (31) and the second telescopic rod (32). The first sliding rail (28) sliders within the track of the second sliding rail (29). The polishing device (30) slides within the track of the first sliding rail (28), and the polishing range is the area of the polishing table (27).

The polishing machine head (33) includes a polishing machine protective cover (10), a third sliding rail (34), a fourth sliding rail (35), a third telescopic rod (60), a vacuum suction device (36), a first vacuum machine (4), and a tri-color light (5), wherein the third sliding rail (34) is fixed on an inner wall of a top of the polishing machine protective cover (10), the fourth sliding rail (35) slides within a track of the third sliding rail (34), the vacuum suction device (36) is fixed on the third telescopic rod (60), the third telescopic rod (60) slides within a track of the fourth sliding rail (35), and the first vacuum machine (4) and the tri-color light (5) are fixed on the top of the outer wall of the polishing machine protective cover (10).

Figure 8:
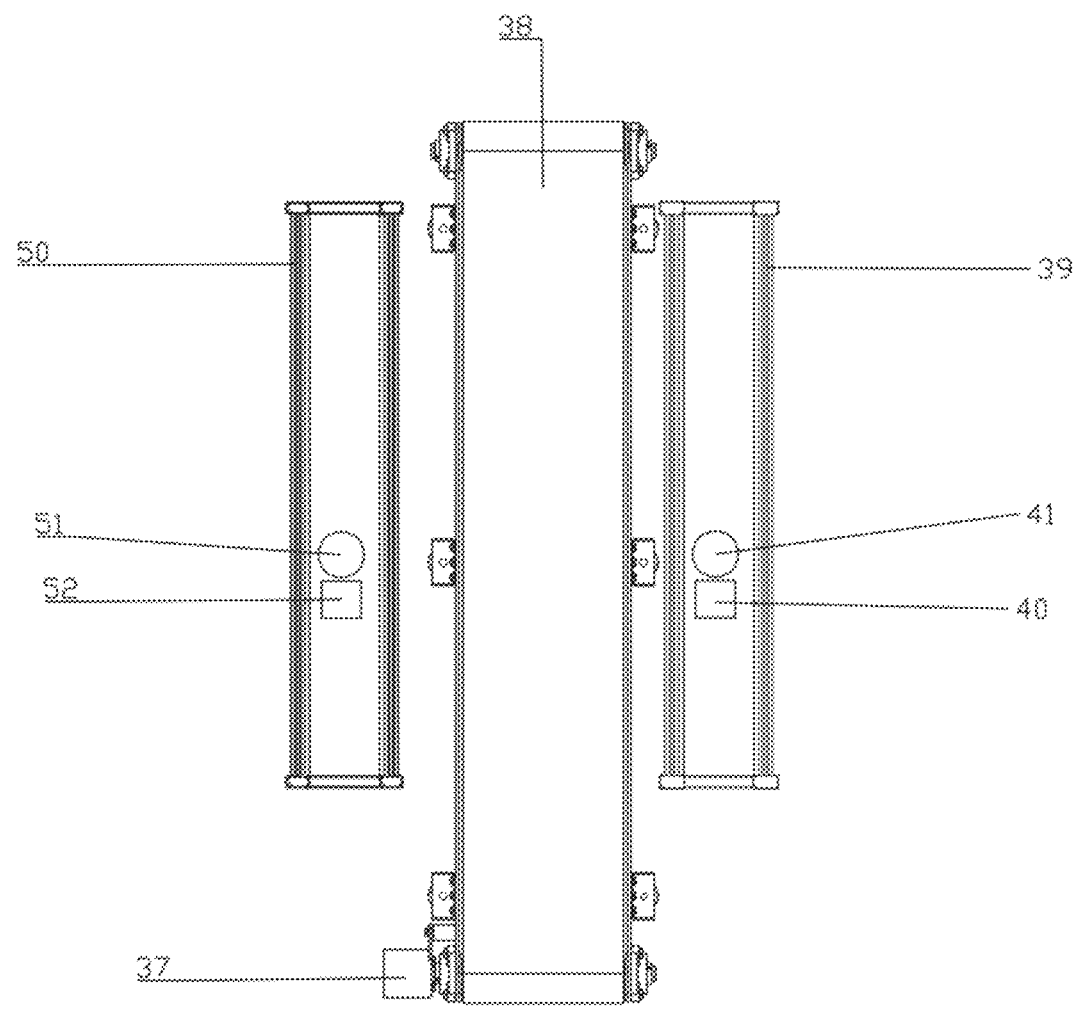
FIG. 8 is a schematic diagram of the transmission device and frame of the invention.
Figure 9:
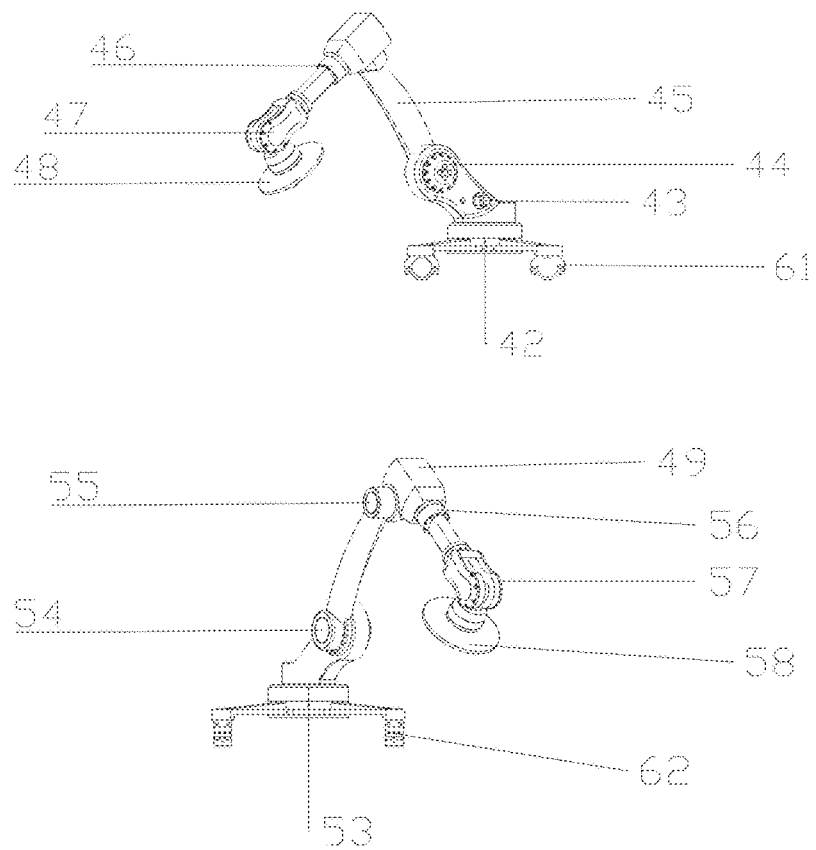
FIG. 9 is a schematic diagram of the mechanical sucker hand of the invention.

As shown in FIG. 1, and FIG. 8-FIG. 9, the automatic stacking device (8) includes a second motor (37), a conveying device (38), a first bracket (39), a second bracket (50), a third motor (40), a fourth motor (51), a second vacuum machine (41), a third vacuum machine (52), a first suction cup manipulator (45), and a second suction cup manipulator (49), wherein the second motor (37) is fixed on the conveying device (38), the third motor (40) and the second vacuum machine (41) are fixed on the first bracket (39), the fourth motor (51) and the third vacuum machine (52) are fixed on the second bracket (50), the first suction cup manipulator (45) and the second suction cup manipulator (49) are respectively fixed on the first bracket (39) and the second bracket (50), and the first bracket (39) and the second bracket (50) are arranged on both sides of the conveying device (38).

As shown in FIG. 1 and FIG. 9, the first suction cup manipulator (45) includes a first chassis (42), a first rotation device (43), a second rotation device (44), a third rotation device (46), a fourth rotation device (47), a first fixture (61), and a first vacuum suction cup (48); the first suction cup manipulator (45) slides on the first bracket (39) through the first fixture (61) arranged on the first chassis (42), and is combined with the first rotation device (43), the second rotation device (44), the third rotation device (46), the fourth rotation device (47), allowing for any rotation with 6 degrees of freedom; and the first vacuum suction cup (48) is fixed at the end of the first suction cup manipulator (45) through the fourth rotation device (47).

As shown in FIG. 1 and FIG. 9, the second suction cup manipulator (49) includes a second chassis (53), a fifth rotation device (54), a sixth rotation device (55), a seventh rotation device (56), an eighth rotation device (57), a second fixture (62), and a second vacuum suction cup (58); the second suction cup manipulator (49) slides on the second bracket (50) through the second fixture (62) arranged on the second chassis (53), and is combined with the fifth rotation device (54), the sixth rotation device (55), the seventh rotation device (56), the eighth rotation device (57), allowing for any rotation with 6 degrees of freedom; and the second vacuum suction cup (58) is fixed at the end of the second suction cup manipulator (49) through the eighth rotation device (57).

Figure 12:
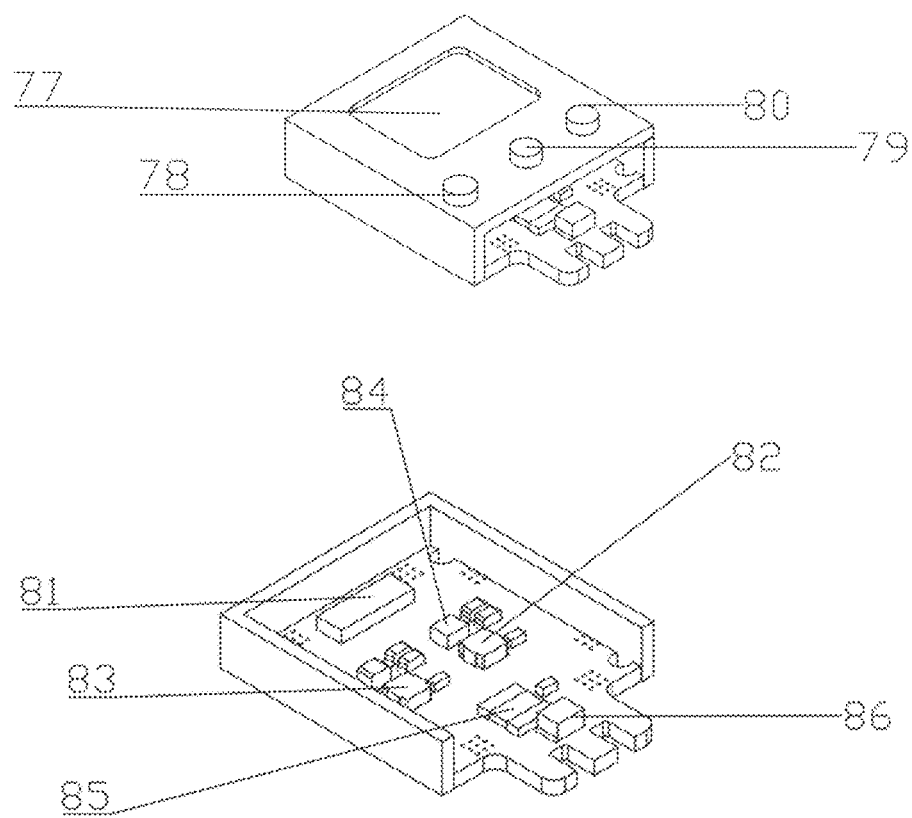
FIG. 12 is a schematic diagram of the operating system of the invention.

As shown in FIG. 12, the operating system (2) comprises an operating panel (77), a power supply (78), an indicator light (79), a circuit breaker (80), a stepper motor (81), a displacement sensor (82), a machine vision sensor (83), a protection device (84), a pneumatic actuator (85), and a signal converter (86).

Figure 10:
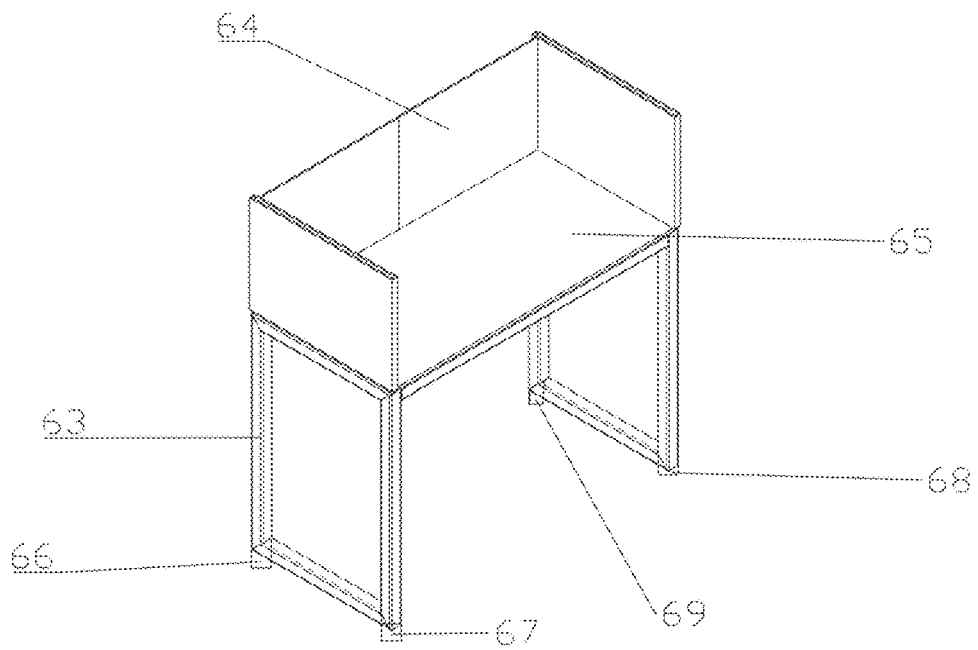
FIG. 10 is a schematic diagram of placing frame 1 of the finished product of the invention.

As shown in FIG. 1 and FIG. 10, the first finished product placement rack includes a first frame (63), a first cabinet door (64), a first placement plate (65), a first roller (66), a second roller (67), a third roller (68), and a fourth roller (69). The first placement plate (65), the first cabinet door (64), the first roller (66), the second roller (67), the third roller (68), and the fourth roller (69) are respectively fixed to the first frame (63).

Figure 11:
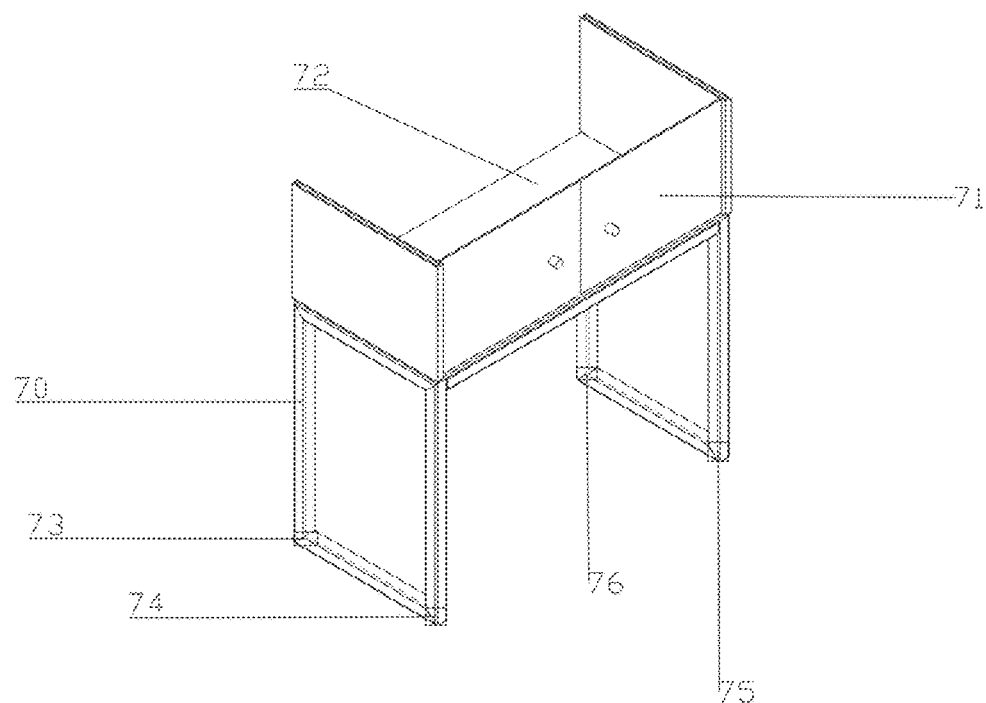
FIG. 11 is a schematic diagram of the finished product placement rack II of the invention.

As shown in FIG. 1 and FIG. 11, the second finished product placement rack includes a second frame (70), a second cabinet door (71), a second placement plate (72), a fifth roller (73), a sixth roller (74), a seventh roller (75), and an eighth roller (76). The second cabinet door (71), the second placement plate (72), the fifth roller (73), the sixth roller (74), the seventh roller (75), and the eighth roller (76) are respectively fixed to the second frame (70).

Figure 13:
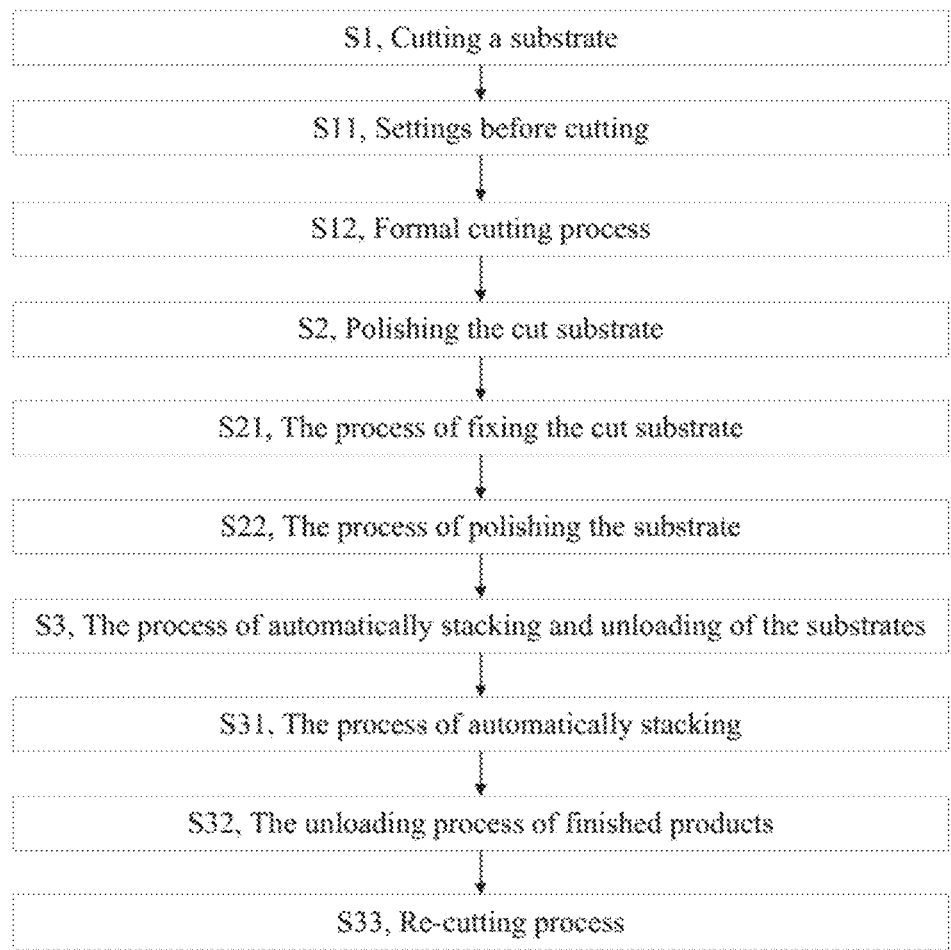
FIG. 13 is a schematic diagram of the operating flow of the invention . . .

As shown in FIG. 13, an operation method for the integrated machine for automatic cutting, polishing, stacking, and unloading of substrates is provided, during cutting and polishing process, a working process is divided into processes of cutting substrates, polishing substrates, and automatic stacking and unloading substrates, including the following steps:

S1, cutting a substrate, including the following steps:

S11, Settings before cutting: first setting a size of the substrate to be cut on the operating system, wherein the size of the substrate to be cut on the laser cutting machine (1) is any size, but at most two different cutting sizes allow to be set each time; after the substrate is unloaded, different cutting sizes allow to be set again;

S12, Formal cutting process: when the substrate enters the laser cutting machine (1), the first camera (24) on the laser cutting machine (1) starts scanning the substrate; when the substrate stops on the cutting table (17), the first camera (24) positions the substrate, then finds a midpoint position of the substrate, and then fixes the laser source (16) on the mechanical laser arm (59) to cut the substrate according to the set size requirements through the laser equipment (11), wherein a cutting range of the mechanical laser arm (59) is the area of the cutting table (17), and the mechanical laser arm (59) has 7 degrees of freedom to flexibly complete the cutting of the substrate; obtaining a cut substrate after the cutting is completed, the cut substrate continues to be polished through the polishing machine (3);

S2, polishing the cut substrate, including the following steps:

S21, The process of fixing the cut substrate: the cut substrate enters the polishing machine (3) for polishing, and the second camera (25) scans the cut substrate and sends position information of the cut substrate to the polishing machine (3); when the cut substrate stops on the polishing table (27), the second camera (25) locates the cut substrate, finds a midpoint position of the cut substrate, and the vacuum suction device (36) absorbs the cut substrate; the vacuum suction device (36) extends and retracts the cut substrate to a certain position through the third telescopic rod (60), and then stops to fix the cut substrate;

S22, The process of polishing the substrate: the polishing device (30) slides through the first sliding rail (28) and the second sliding rail (29), wherein the polishing range is the area of the polishing table (27); the second sliding rail (29) moves up and down through the first telescopic rod (31) and the second telescopic rod (32) to fit the substrate, and then the polishing device (30) polishes edges of the cut substrate; obtaining a polished substrate after polishing, the vacuum suction device (36) places the polished substrate on the polishing table (27) through the third telescopic rod (60), and the polished substrate continues to be stacked through the automatic stacking device (8);

S3, The process of automatically stacking and unloading of the substrates, including the following steps:

S31, The process of automatically stacking includes following steps: transporting the polished substrate through a conveying device, the first suction cup manipulator (45) slides on the first bracket (39) through the first fixture (61) on the first chassis (42), and the second suction cup manipulator (49) slides on the second bracket (50) through the second fixture (62) on the second chassis (53), wherein the first suction cup manipulator (45) and the second suction cup manipulator (49) allow for any rotation with 6 degrees of freedom; the first vacuum suction cup (48) and the second vacuum suction cup (58) on the first suction cup manipulator (45) and the second suction cup manipulator (49) to suck and pick up the polished substrate on the conveying device (38) according to the set requirements; the first suction cup manipulator (45) and the second suction cup manipulator (49) respectively suck two different sizes of substrates, and place the two different substrates on the first finished product placement rack (6) and the second finished product placement rack (7), respectively, wherein the first finished product placement rack (6) and the second finished product placement rack (7) are configured to store the substrates of different sizes separately;

S32, The unloading process of finished products: the first finished product placement rack (6) and the second finished product placement rack (7) are respectively provided with wheels; when there are enough substrates stored on the first finished product placement rack (6) and the second finished product placement rack (7), pulling the first finished product placement rack (6) and the second finished product placement rack (7) to the designated storage area of the substrates, opening cabinet doors of the first finished product placement rack (6) and the second finished product placement rack (7), then unloading the substrates;

S33, Re-cutting process: after the unloading of the substrate is completed, placing the first finished product placement rack (6) and the second finished product placement rack (7) back in original positions. choosing to set a different cutting size on the operating system (2) of the laser cutting machine (1), but at most two cutting sizes allow to be set at the same time, or choosing to keep the cutting size last time without changed, so as to cut according to the original cutting size.

What is claimed is:

1. An integrated machine for automatic cutting, polishing, stacking, and unloading of substrates, comprising a laser cutting machine (1), a mechanical laser arm (59), an operating system (2), a polishing machine (3), a polishing device (30), a first finished product placement rack (6), a second finished product placement rack (7), and an automatic stacking device (8), wherein the mechanical laser arm (59) is fixed on the laser cutting machine bench (19), the operating system (2) is fixed on a laser cutting machine protective cover (9), the polishing device (30) is fixed on a polishing machine bench (26), the first finished product placement rack (6) is placed on a side of a second bracket (50), and the second finished product placement rack (7) is placed on a side of a first bracket (39);

the laser cutting machine (1), the polishing machine (3), the automatic stacking device (8), the first finished product placement rack (6), and the second finished product placement rack (7) are all placed on the same horizontal plane;

the laser cutting machine (1) comprises a laser cutting machine bench (19) and a laser cutting machine head (20), wherein the laser cutting machine bench (19) comprises a cutting table (17), the mechanical laser arm (59), and a first motor (18), wherein the first motor (18), the cutting table (17), and the mechanical laser arm (59) are all fixed on the laser cutting machine bench (19), and an operating range of the mechanical laser arm (59) is an area of the cutting table (17);

the laser cutting machine head (20) comprises the laser cutting machine protective cover (9), the operating system (2), and a first camera (24) and a second camera (25), wherein the operating system (2) is fixed on an outside of a side of the laser cutting machine protective cover (9), and the first camera (24) and the second camera (25) are fixed on an inside of a top of the laser cutting machine protective cover (9);

the mechanical laser arm (59) comprises a laser equipment (11), a first rotary joint (12), a second rotary joint (13), a third rotary joint (14), a fourth rotary joint (15), and a laser source (16), wherein the laser equipment (11) is fixed on an outer wall of the mechanical laser arm (59), the mechanical laser arm (59) is combined by the first rotary joint (12), the second rotary joint (13), the third rotary joint (14), the fourth rotary joint (15), the laser source (16) is fixed at an end of the mechanical laser arm (59) through the fourth rotary joint (15), and the mechanical laser arm (59) is rotated freely with 7 degrees of freedom;

the polishing machine (3) comprises the polishing machine bench (26) and a polishing machine head (33), wherein the polishing machine bench (26) comprises a polishing table (27), a first sliding rail (28), a second sliding rail (29), a polishing device (30), a first telescopic rod (31), and a second telescopic rod (32); the polishing table (27), the first telescopic rod (31), and the second telescopic rod (32) are fixed on the polishing machine bench (26); the second sliding rail (29) is fixed on the first telescopic rod (31) and the second telescopic rod (32); the first sliding rail (28) sliders within a track of the second sliding rail (29); the polishing device (30) slides within a track of the first sliding rail (28), and a polishing range is an area of the polishing table (27);

the polishing machine head (33) comprises a polishing machine protective cover (10), a third sliding rail (34), a fourth sliding rail (35), a third telescopic rod (60), a vacuum suction device (36), a first vacuum machine (4), and a tri-color light (5), wherein the third sliding rail (34) is fixed on an inner wall of a top of the polishing machine protective cover (10), the fourth sliding rail (35) slides within a track of the third sliding rail (34), the vacuum suction device (36) is fixed on the third telescopic rod (60), the third telescopic rod (60) slides within a track of the fourth sliding rail (35), and the first vacuum machine (4) and the tri-color light (5) are fixed on a top of an outer wall of the polishing machine protective cover (10);

the automatic stacking device (8) comprises a second motor (37), a conveying device (38), a first bracket (39), a second bracket (50), a third motor (40), a fourth motor (51), a second vacuum machine (41), a third vacuum machine (52), a first suction cup manipulator (45), and a second suction cup manipulator (49), wherein the second motor (37) is fixed on the conveying device (38), the third motor (40) and the second vacuum machine (41) are fixed on the first bracket (39), the fourth motor (51) and the third vacuum machine (52) are fixed on the second bracket (50), the first suction cup manipulator (45) and the second suction cup manipulator (49) are respectively fixed on the first bracket (39) and the second bracket (50), and the first bracket (39) and the second bracket (50) are arranged on both sides of the conveying device (38).

2. The integrated machine for automatic cutting, polishing, stacking, and unloading of substrates as claimed in claim 1, wherein the first suction cup manipulator (45) comprises a first chassis (42), a first rotation device (43), a second rotation device (44), a third rotation device (46), a fourth rotation device (47), a first fixture (61), and a first vacuum suction cup (48); the first suction cup manipulator (45) slides on the first bracket (39) through the first fixture (61) arranged on the first chassis (42), and is combined with the first rotation device (43), the second rotation device (44), the third rotation device (46), the fourth rotation device (47), allowing for any rotation with 6 degrees of freedom; and the first vacuum suction cup (48) is fixed at an end of the first suction cup manipulator (45) through the fourth rotation device (47).

3. The integrated machine for automatic cutting, polishing, stacking, and unloading of substrates as claimed in claim 1, wherein the second suction cup manipulator (49) comprises a second chassis (53), a fifth rotation device (54), a sixth rotation device (55), a seventh rotation device (56), an eighth rotation device (57), a second fixture (62), and a second vacuum suction cup (58); the second suction cup manipulator (49) slides on the second bracket (50) through the second fixture (62) arranged on the second chassis (53), and is combined with the fifth rotation device (54), the sixth rotation device (55), the seventh rotation device (56), the eighth rotation device (57), allowing for any rotation with 6 degrees of freedom; and the second vacuum suction cup (58) is fixed at an end of the second suction cup manipulator (49) through the eighth rotation device (57).

4. The integrated machine for automatic cutting, polishing, stacking, and unloading of substrates as claimed in claim 1, wherein the operating system (2) comprises an operating panel (77), a power supply (78), an indicator light (79), a circuit breaker (80), a stepper motor (81), a displacement sensor (82), a machine vision sensor (83), a protection device (84), a pneumatic actuator (85), and a signal converter (86).

5. The integrated machine for automatic cutting, polishing, stacking, and unloading of substrates as claimed in claim 1, wherein the first finished product placement rack comprises a first frame (63), a first cabinet door (64), a first placement plate (65), a first roller (66), a second roller (67), a third roller (68), and a fourth roller (69); the first placement plate (65), the first cabinet door (64), the first roller (66), the second roller (67), the third roller (68), and the fourth roller (69) are respectively fixed to the first frame (63).

6. The integrated machine for automatic cutting, polishing, stacking, and unloading of substrates as claimed in claim 1, wherein the second finished product placement rack comprises a second frame (70), a second cabinet door (71), a second placement plate (72), a fifth roller (73), a sixth roller (74), a seventh roller (75), and an eighth roller (76); the second cabinet door (71), the second placement plate (72), the fifth roller (73), the sixth roller (74), the seventh roller (75), and the eighth roller (76) are respectively fixed to the second frame (70).

7. An operation method for the integrated machine for automatic cutting, polishing, stacking, and unloading of substrates as claimed in claim 1, comprising following steps:
- step 1, cutting a substrate by the laser cutting machine (1), comprising following steps:
- step 11, first setting a size of the substrate to be cut on the operating system (2), wherein the size of the substrate to be cut on the laser cutting machine (1) is any size, but at most two different cutting sizes allow to be set each time; after the substrate is unloaded, different cutting sizes allow to be set again;
- step 12, when the substrate enters the laser cutting machine (1), the first camera (24) on the laser cutting machine (1) starts scanning the substrate; when the substrate stops on the cutting table (17), the first camera (24) positions the substrate, then finds a midpoint position of the substrate, and then fixes the laser source (16) on the mechanical laser arm (59) to cut the substrate according to the set size requirements through the laser equipment (11), wherein a cutting range of the mechanical laser arm (59) is the area of the cutting table (17), and the mechanical laser arm (59) has 7 degrees of freedom to flexibly complete the cutting of the substrate; obtaining a cut substrate after the cutting is completed, the cut substrate continues to be polished through the polishing machine (3);
- step 2, polishing the cut substrate, comprising following steps:
- step 21, the cut substrate enters the polishing machine (3) for polishing, and the second camera (25) scans the cut substrate and sends position information of the cut substrate to the polishing machine (3); when the cut substrate stops on the polishing table (27), the second camera (25) locates the cut substrate, finds a midpoint position of the cut substrate, and the vacuum suction device (36) absorbs the cut substrate; the vacuum suction device (36) extends and retracts the cut substrate to a certain position through the third telescopic rod (60), and then stops to fix the cut substrate;
- step 22, the polishing device (30) slides through the first sliding rail (28) and the second sliding rail (29), wherein the polishing range is the area of the polishing table (27); the second sliding rail (29) moves up and down through the first telescopic rod (31) and the second telescopic rod (32) to fit the substrate, and then the polishing device (30) polishes edges of the cut substrate; obtaining a polished substrate after polishing, the vacuum suction device (36) places the polished substrate on the polishing table (27) through the third telescopic rod (60), and the polished substrate continues to be stacked through the automatic stacking device (8);
- step 3, automatically stacking and unloading of the substrates, comprising following steps:
- step 31, transporting the polished substrate through a conveying device, the first suction cup manipulator (45) slides on the first bracket (39) through the first fixture (61) on the first chassis (42), and the second suction cup manipulator (49) slides on the second bracket (50) through the second fixture (62) on the second chassis (53), wherein the first suction cup manipulator (45) and the second suction cup manipulator (49) allow for any rotation with 6 degrees of freedom; the first vacuum suction cup (48) and the second vacuum suction cup (58) on the first suction cup manipulator (45) and the second suction cup manipulator (49) to suck and pick up the polished substrate on the conveying device (38) according to the set requirements; the first suction cup manipulator (45) and the second suction cup manipulator (49) respectively suck two different sizes of substrates, and place the two different substrates on the first finished product placement rack (6) and the second finished product placement rack (7), respectively, wherein the first finished product placement rack (6) and the second finished product placement rack (7) are configured to store the substrates of different sizes separately;

step 32, the first finished product placement rack (6) and the second finished product placement rack (7) are respectively provided with wheels; when there are enough substrates stored on the first finished product placement rack (6) and the second finished product placement rack (7), pulling the first finished product placement rack (6) and the second finished product placement rack (7) to the designated storage area of the substrates, opening cabinet doors of the first finished product placement rack (6) and the second finished product placement rack (7), then unloading the substrates;

step 33, after the unloading of the substrate is completed, placing the first finished product placement rack (6) and the second finished product placement rack (7) back in original positions, choosing to set a different cutting size on the operating system (2) of the laser cutting machine (1), but at most two cutting sizes allow to be set at the same time, or choosing to keep the cutting size last time without changed, so as to cut according to the original cutting size.

\* \* \* \* \*